(12) United States Patent
Olomskiy (10) Patent No.: US 8,682,742 B2
(45) Date of Patent: Mar. 25, 2014

(54) SYSTEM AND METHOD FOR ENABLING USERS TO PURCHASE IN-GAME CONTENT FOR EACH OTHER

(75) Inventor: Evgeny Olomskiy, Vladivostok (RU)

(73) Assignee: Zotobi Management Ltd., Tortola (VG)

( * ) Notice: Subject to any disclaimer, the term of this patent is extended or adjusted under 35 U.S.C. 154(b) by 39 days.

(21) Appl. No.: 13/460,540

(22) Filed: Apr. 30, 2012

(65) Prior Publication Data

US 2013/0290137 A1 Oct. 31, 2013

(51) Int. Cl.
*G06Q 30/00* (2012.01)
(52) U.S. Cl.
USPC ....................................... 705/26.1
(58) Field of Classification Search
USPC ....................................... 705/26.1
See application file for complete search history.

(56) References Cited

U.S. PATENT DOCUMENTS

| 7,867,094 B1* | 1/2011 | Wisdom et al. ............... 463/43 |
| 2009/0319609 A1 | 12/2009 | Ferraro ....................... 709/204 |
| 2010/0227675 A1 | 9/2010 | Luxton et al. .................. 463/25 |
| 2010/0255903 A1 | 10/2010 | Bala ............................... 463/30 |
| 2011/0212762 A1 | 9/2011 | Ocko et al. ..................... 463/25 |
| 2011/0212769 A1 | 9/2011 | Carroll et al. .................. 463/29 |
| 2011/0230256 A1 | 9/2011 | Adra et al. ...................... 463/25 |

* cited by examiner

*Primary Examiner* — Mila Airapetian
(74) *Attorney, Agent, or Firm* — Pillsbury Winthrop Shaw Pittman LLP (57) ABSTRACT

A virtual space may be provided to users to participate in, e.g., a game. The users may be able to purchase access to unlockable in-game content within the virtual space for other users, also referred to beneficiaries. Responsive to the completion of such a purchase transaction, access to the purchased unlockable in-game content is facilitated for the one or more beneficiaries.

22 Claims, 3 Drawing Sheets

SYSTEM AND METHOD FOR ENABLING USERS TO PURCHASE IN-GAME CONTENT FOR EACH OTHER

FIELD

The disclosure relates to systems and methods for enabling users to make purchases. The purchases pertain to a virtual space in which users participate in a game. In particular, the disclosure involves a user purchasing access to unlockable in-game content for one or more other users.

BACKGROUND

Virtual spaces that enable users to participate in games and/or other online (social) activities are known. In some of these virtual spaces, users can make in-game purchases, e.g. for virtual objects that are usable within the virtual space. In some virtual spaces, at least some of the content is not accessible until a user unlocks it, such as, by way of non-limiting example, a bonus level. In some virtual spaces, unlocking and/or accessing such content could occur as a consequence of one or more of the following actions: a user accomplishing a particular achievement, or a user purchasing access to such content.

SUMMARY

One aspect of the disclosure relates to providing a virtual space to users. The virtual space may be used to enable users to participate in a game. One aspect of the disclosure relates to systems, devices, and methods for enabling purchases of access to unlockable in-game content for users in a virtual space.

In some implementations, the system may include one or more servers and one or more client computing platforms configured to operate in a server/client configuration. The client computing platform may be associated with the individual user. View information of the virtual space may be transmitted and/or presented to the users on client computing platforms. Users may be able to interact with the virtual space and/or participate in activities through inputs to the client computing platforms. Individual ones of the client computing platforms may be interchangeably referred to herein as computing devices. The server may be configured to execute one or more of a virtual space module, a purchase module, a distribution module, a user selection module, a content selection module, and/or other modules.

The virtual space module may be configured to determine view information for transmissions to client computing platforms associated with users. View information may facilitate presentation of views of a virtual space to individual users on the client computing platforms. View information of a game may include any information needed to present the game to a user, or any subset of such information, and/or to enable participation and/or interaction of the user with the game. Some or all of the virtual space may be common among multiple users. Individual users may be represented in the virtual space by one or more avatars in views of the virtual space. Avatars may include a combination of graphics, text, animations, video, and/or other design components that together serve the function to represent users within the virtual space. The users may comprise a first user represented by a first avatar, a second user represented by a second avatar, and/or other users.

The purchase module may be configured to receive and/or process payments from users for purchases. The purchases may pertain to virtual goods in general, and to access of unlockable in-game content, by one or more users, in particular. In the context of this specification, access to content may include the ability to access content, such that a purchase of access to particular content may mean the purchase of the ability to access that particular content. The ability to access content does not imply, nor require, that the content is actually accessed. For example, the purchase module may be configured to receive a first payment from a first user. The first payment may correspond to a specific purchase of access to a set of unlockable in-game content, such that the beneficiary of the specific purchase is a second user. In other words, the first user purchases for and/or gifts to the second user. In some implementations, the first user may determine multiple beneficiaries of a purchase.

The content may be not physically tangible (contrary to an object in the real world). The content may be not virtually tangible (contrary to a virtual object within the virtual space such as, e.g., a virtual weapon), but rather be intangible. That is, the intangibility of the content may be analogous to the intangibility of experiences, relationships, opportunities, permissions, and/or other phenomena in the real world. Examples of physically and virtually intangible content may include access to one or more of a level of game play in the virtual space, a mission, a quest, a puzzle, a challenge, episodic content, an ability to play as a particular playable character, an ability to play with the inclusion or addition of a new non-player character that operates outside of the control of a user, and/or other intangible content.

In some implementations, the purchase module may be configured to operate via an external website to process payments. For example, a payment may include a third-party transaction.

The distribution module may be configured to facilitate access to purchased unlockable in-game content for one or more beneficiaries of a particular purchase. Operation of the distribution module may be responsive to receipt of a payment corresponding to the particular purchase, as described in relation to the operation of the purchase module. In some implementations, the distribution module distributes a virtual object, such as, e.g., a key, cipher, code, card, map, password, token, and/or other virtual object, which in turn facilitates the access. In some implementations, the distribution module manages and/or stores information that may be used to facilitate the access. For example, the distribution module may manage a database used to store and/or keep track of (purchases of) the ability to access particular unlockable in-game content.

The user selection module may be configured to present a user with a way to select one or more users within the virtual space, in particular one or more users that may be intended beneficiaries of a purchase as described herein. For example, a particular user may be presented with an offered set of user identifiers that identify users within the virtual space. User identifiers may include, e.g., user names, user representations, avatars of users, images of avatars of users, and/or other user identifiers, and/or a combination thereof. The user selection module may be further configured to receive selections from users of one or more user identifiers. In some implementations, individual ones of the selections may be received from individual users. For example, the user selection module may receive a selection from a particular user, such that the selection indicates one or more other users within the virtual space that are to be assigned as beneficiaries of an instant and/or future purchase by the particular user, as described herein.

In some implementations, the user selection module may be configured to generate and/or present a graphical user interface for presentation to users. A graphical user interface may be simply referred to herein as interface. Presenting information to a user and/or obtaining a selection from a user may be accomplished through such an interface.

The content selection module may be configured to present a user with a way to select one or more virtual goods and/or items of unlockable in-game content for purchase. For example, a particular user may be presented with an offered set of content identifiers that identify items of unlockable in-game content within the virtual space. Content identifiers may include, e.g., content descriptions, content titles, content representations, images pertaining to particular content, and/or other content identifiers, and/or a combination thereof. The content selection module may be further configured to receive selections from users of one or more content identifiers. In some implementations, individual ones of the selections may be received from individual users. For example, the content selection module may receive a selection from a particular user, the selection indicating a set of unlockable in-game content, such that access to the set of unlockable in-game content is to be facilitated for one or more predetermined users, upon completion of the purchase transaction. In some implementations, the one or more predetermined users are selected through the user selection module.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
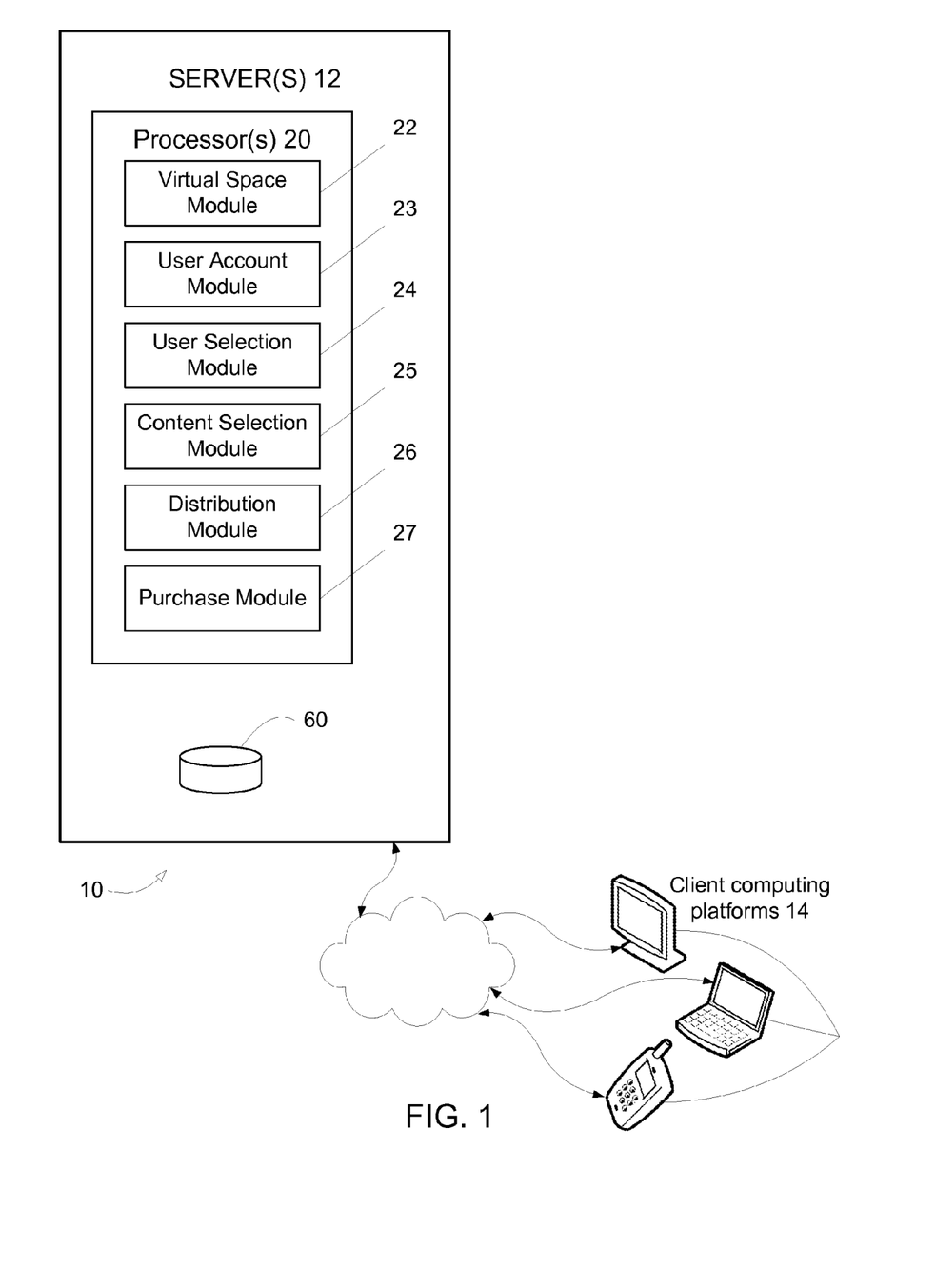
FIG. 1 illustrates a system configured to enable a purchase of access to unlockable in-game content within a virtual space.

FIG. 1 illustrates a system 10 configured to enable a purchase of access to unlockable in-game content for a user in a virtual space. The system 10 may be configured such that the users participate in a game within the virtual game environment. A user interface provided to the users may facilitate a convenient and intuitive interface feature for making purchases and/or purchasing gifts for one or more users. Providing the virtual space may include hosting the virtual space over a network.

System 10 may include one or more servers 12, hereinafter simply referred to as server 12. Server 12 may be configured to communicate with one or more client computing platforms 14 (hereinafter simply referred to as client computing platform 14 or client computing platforms 14) according to, e.g., a client/server architecture. The users may access system 10 and/or the virtual game space via client computing platforms 14.

Server 12 may be configured to execute one or more computer program modules. The computer program modules may include one or more of virtual space module 22, a user account module 23, a user selection module 24, a content selection module 25, a distribution module 26, a purchase module 27, and/or other modules.

Virtual space module 22 of system 10 in FIG. 1 may be configured to provide one or more virtual spaces to users via client computing platforms 14. As used herein, a "virtual space" may include one or more interactive, electronic social media, and/or other virtual environments. A virtual space may refer to a virtual environment in which a game is being played that involves a plurality of users. Providing a virtual environment to users may include hosting, supporting, and/or executing one or more instances of a virtual environment, determining view information defining and/or representing the virtual environment (e.g., from one or more instances) for the users (e.g., individually and/or collectively), transmitting the view information to the client computing platforms 14 associated with the users to facilitate views of the virtual environment being presented to the users, and/or other activities.

Interactive, electronic social media may include one or more of a social network, a micro-blogging service, a blog service (or host), a browser-based game, a multi-player mobile game, a file (e.g., image file, video file, and/or other files) sharing service, a messaging service, a message board, a forum, and/or other electronically distributed media that are scalable and enable interaction between the users. As was the case with virtual spaces, in some implementations, users may be represented within interactive, electronic social media by avatars. An avatar representing a given user may be presented in views of the interactive, electronic social media as being associated with content that may be provided by the given user, directed the given user, related to the given user, and/or associated with the given user in other ways. Some non-limiting specific examples of interactive, electronic social media may include the micro-blogging service provided by Twitter™, the social network provided by Facebook™, the social network provided by MySpace™, the social network provided by Foursquare®, the virtual world provided by SecondLife®, the massively multi-player online game provided by World of Warcraft®, the file sharing service provided by Flickr®, Blogger, YouTube, PlayStation® Home, Xbox® Live, and/or other interactive electronic social media.

In some implementations, in views of the virtual space, avatars may represent users as a game is being played and/or other activities are performed (collectively referred to herein as activities) by and/or among the users in the virtual space. Avatars may include a combination of graphics, text, animations, video, and/or other design components that together serve the function to represent users within the virtual space.

A virtual space may comprise a simulated space that is accessible by users via clients (e.g., client computing platforms 14) that present the views of the virtual space to a user. The simulated space may have a simulated physical layout, express ongoing real-time interaction by one or more users, and/or be constrained by simulated physics that governs interactions between virtual objects in the simulated space. In some instances, the simulated physical layout may be a 2-dimensional layout. In other instances, the simulated physical layout may be a 3-dimensional layout.

Virtual space module 22 of server 12 in FIG. 1 may be configured to express the virtual space in a relatively limited manner. For example, views of the virtual space presented to the users may be selected from a limited set of graphics depicting an event in a given place within the virtual space. The views may include additional content (e.g., text, audio, pre-stored video content, movable icons, avatars, and/or other content) that describes particulars of the current state of the virtual space, beyond the relatively generic graphics. For example, a view of the virtual space may depict a card table and/or a non-player character that are static (or change relatively little) visually in views of the virtual space. Icons representing game components (e.g., game pieces, playing cards, dice, and/or other game components) may change and/or move within the views of the virtual space to depict a game being played within the virtual space. Such limited representation of the virtual space may reduce the cost of hosting the virtual space in terms of processing, storage, communication bandwidth, and/or other computing resource (e.g., on server 12 and/or client computing platforms 14). Other expressions of individual places within the virtual space are contemplated.

Within the instance(s) of the virtual space (or other virtual environment) executed by virtual space module 22, users may control avatars to interact with the virtual space and/or each other. As used herein, the term "user character" may refer to an object (or group of objects) present in the virtual space that represents an individual user. The avatar may be controlled by the user with which it is associated. The avatar representing a given user may be created and/or customized by the given user. The user may have an "inventory" of virtual goods and/or currency that the user can use (e.g., by manipulation of an avatar or other user controlled element, and/or other items), display, gift, and/or otherwise interact with within the virtual space.

The users may participate in the virtual space by controlling one or more of the available user controlled elements in the virtual space (e.g., game elements, avatars, and/or other elements). Control may be exercised through control inputs and/or commands input by the users through client computing platforms 14.

It will be appreciated that the description herein of virtual space module 22 providing a virtual space to a set of users in which a game is being played by the set of users is not intended to be limiting. For example, virtual space module 22 may be configured to provide a plurality of different virtual spaces to a plurality of different sets of users. The individual sets of users may be participating in different instances of a game within the individual virtual spaces. The concepts described herein with respect to the individual virtual space and game should be extendible to implementations in which a plurality of different virtual spaces are being used to conduct a plurality of different instances of the game (e.g., between different sets of users).

User account module 23 may be configured to manage (storage for and/or access to) account information and/or a user profile of a user. Account information and/or a user profile may include information stored by server 12, information stored by one or more client computing platforms 14, and/or information stored at other storage locations. Account information for a specific user may be included within a user profile associated with the specific user. Account information may include information identifying a user (e.g. a username or handle, a number, an identifier, and/or other identifying information), user information, subscription information, virtual currency account information (e.g., related to currency held in credit for a user), credit card information, relationship information (e.g., information related to relationships between users in a virtual environment), usage information, demographic information, settings, preferences, customizations, information related to past interactions, achievements, evaluations, and/or purchases pertaining to a user, information derived by analysis, provided information of a user, stated information, account history of a user, browsing history of a user, a client computing platform identification associated with a user, a phone number associated with a user, and/or other account information.

Information from user account module 23 may be used in and/or by other modules of system 10. In general, information created, gathered, and/or processed by any module may be used in any module of system 10.

Purchase module 27 of system 10 may be configured to receive and/or process payments from users for purchases. The purchases may pertain to access of unlockable in-game content, by one or more users. In the context of this specification, access to content may include the ability to access content, such that a purchase of access to particular content may mean the purchase of the ability to access that particular content. The ability to access content does not imply, nor require, that the content is actually accessed. Purchase module 27 may be configured to receive a first payment, obtained from a first user, corresponding to a particular purchase of access to a set of unlockable in-game content, such that the beneficiary of the particular purchase is a second user. In other words, the first user purchases and/or gifts to the second user. In some implementations, the first user may determine multiple beneficiaries of a purchase.

The content may be not physically tangible (contrary to an object in the real world). The content may be not virtually tangible (contrary to a virtual object within the virtual space such as, e.g., a virtual weapon), but rather be intangible. That is, the intangibility of the content may be analogous to the intangibility of experiences, relationships, opportunities, permissions, and/or other phenomena in the real world. Examples of physically and virtually intangible content may include access to one or more of a level of game play in the virtual space, access to a geographic area within the virtual space, a mission, a quest, a puzzle, a challenge, episodic content, an ability to play as a particular playable character, an ability to play with the inclusion or addition of a new non-player character that operates outside of the control of a user (but may affect game-play, story-arc, and/or other parts of the game experience), and/or other intangible content. In some implementations, items of unlockable in-game content may include a combination of two or more of the given examples. For example, unlockable in-game content may include a mission to be completed within the virtual space as a particular, new, playable character and/or character type, or part of a previously unavailable race, tribe, species, people, alliance, and/or other previously unavailable character type. In some implementations, a purchase may include a combination of a (virtual) tangible good and an intangible good. For example, a purchase of a flying dragon as a mode of transportation within the virtual space may comprise access to a previously inaccessible and/or unavailable geographic area within the virtual space, such as a remote island.

In some implementations, purchase module 27 may be configured to operate via an external website to process payments. For example, a payment may include a third-party transaction.

Distribution module 26 may be configured to facilitate access to purchased unlockable in-game content for one or more beneficiaries of a particular purchase. Operation of distribution module 26 may be responsive to receipt of a payment corresponding to the particular purchase, as described in relation to the operation of the purchase module. In some implementations, distribution module 26 distributes and/or transmits a virtual object, such as, e.g., a key, cipher, code, card, map, password, token, and/or other virtual object, which in turn facilitates the access. In some implementations, distribution module 26 manages and/or stores information that may be used to facilitate the access. For example, distribution module 26 may manage a database (that may be queried when a user is engaged with the virtual space) that is used to store and/or keep track of (purchases of) the ability to access particular unlockable in-game content.

User selection module 24 may be configured to present a user with a way to select one or more users within the virtual space, in particular one or more users that may be intended beneficiaries of a purchase as described herein. For example, a particular user may be presented with an offered set of user identifiers that identify users within the virtual space. User identifiers may include, e.g., user names, user representations, avatars of users, images of avatars of users, and/or other user identifiers, and/or a combination thereof. User selection module 24 may be further configured to receive selections from users of one or more user identifiers. In some implementations, individual ones of the selections may be received from individual users. For example, user selection module 24 may receive a selection from a particular user, such that the selection indicates one or more other users within the virtual space that are to be assigned as beneficiaries of an instant and/or future purchase by the particular user, as described herein.

In some implementations, user selection module 24 may be configured to generate and/or present a graphical user interface for presentation to users. Presenting information to a user and/or obtaining a selection from a user may be accomplished through such an interface.

Content selection module 25 may be configured to present a user with a way to select one or more virtual goods and/or items of unlockable in-game content for purchase. For example, a particular user may be presented with an offered set of content identifiers that identify items of unlockable in-game content within the virtual space. Content identifiers may include, e.g., content descriptions, content titles, content representations, images pertaining to particular content, and/or other content identifiers, and/or a combination thereof. Content selection module 25 may be further configured to receive selections from users of one or more content identifiers. In some implementations, individual ones of the selections may be received from individual users. For example, content selection module 25 may receive a selection from a particular user, the selection indicating a set of unlockable in-game content, such that access to the set of unlockable in-game content is to be facilitated for one or more predetermined users, upon completion of the purchase transaction. In some implementations, the one or more predetermined users are selected through user selection module 24.

Figure 2:
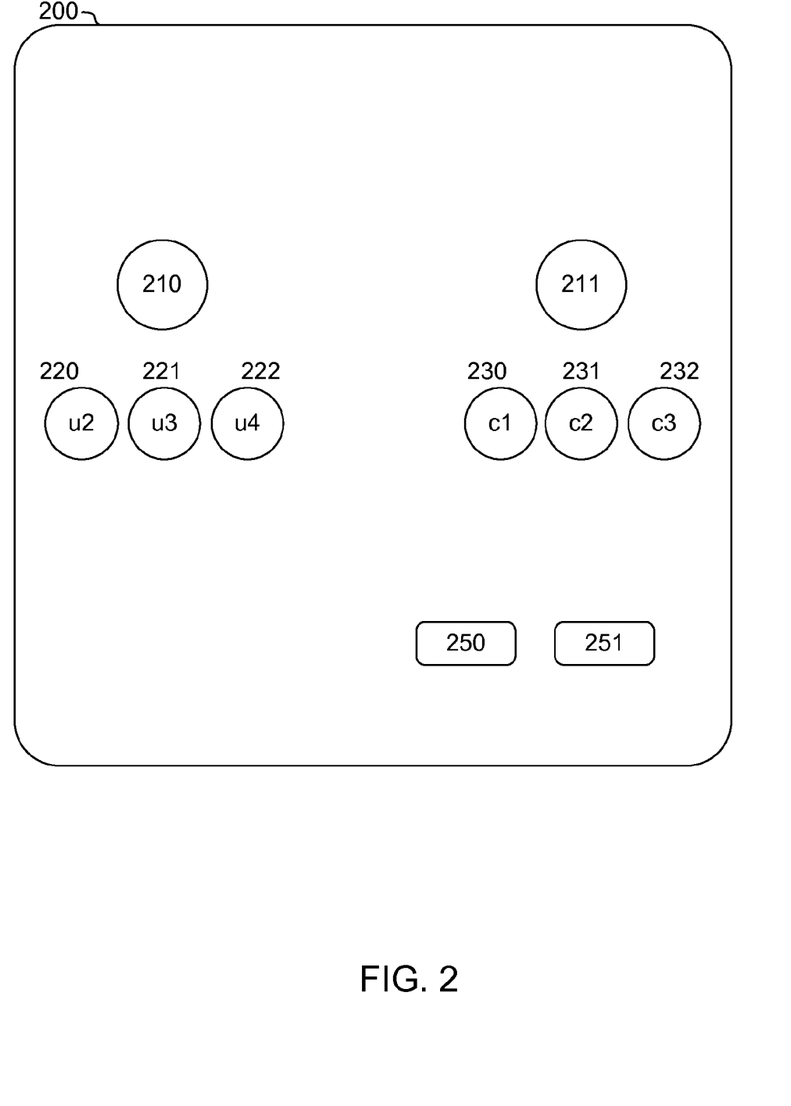
FIG. 2 illustrates a view of a graphical user interface in accordance with some implementations.

By way of illustration, FIG. 2 illustrates a view of a graphical user interface 200, in accordance with some implementations. For the purpose of describing an exemplary implementation of a user interface in this disclosure, user interface 200 in FIG. 2 may be presented to a first user within the virtual space. User interface 200 includes multiple interface elements, including user selection element 210, content selection element 211, user identifiers 220-222, content identifiers 230-232, information element 250, action element 251, and/or other interface elements. In some implementations, user interface 200 may be generated and/or presented by one or more of user selection module 24, content selection module 25, and/or purchase module 27.

In some implementations, a user interface module may be configured to generate and/or present user interfaces, such as user interface 200, to users. Operation of such an interface module may be based on information from user selection module 24, content selection module 25, and/or purchase module 27. For example, different elements and/or sections of user interface 200 may be generated and/or presented by different modules of system 10. Elements of user interface 200 may be implemented as fields configured to receive entry, selection, and/or confirmation from a user. The fields may include one or more of a text entry field, a set of selectable menu items, a selectable field, and/or other fields configured to receive entry, selection, and/or confirmation from a user, e.g. the first user.

Through user interface 200, the first user may be presented with offered sets of user identifiers and content identifiers for selection by the first user. Responsive to receipt of selections of one or more user identifiers and one or more content identifiers, the first user may confirm the purchase through action element 251.

User selection element 210 in FIG. 2 may include one or more user identifiers that identify users within the virtual space. In some implementations, user selection element 210 comprises a single representation and/or identification for a group of users. In some implementations, user selection element 210 is a field configured to receive, e.g., text entry from a user. For example, the text entry may be used to filter and/or search through a set of user identifiers for selection. User identifiers 220-222 may represent individual users, for example, as indicated in FIG. 2, a second user ("u2"), third user ("u3"), and fourth user ("u4"), respectively. The first user may select (and/or deselect) individual users by, e.g., selecting individual ones of user identifiers 220-222. Selection by the first user may be indicated visually within user interface 200 in numerous different ways, including presenting a checkmark along an individual user identifier, changing a background and/or border around an individual user identifier, and/or by another visually distinct way that distinguishes selected user identifiers from deselected user identifiers.

Content selection element 211 in FIG. 2 may include one or more content identifiers that identify virtual goods, in particular unlockable in-game content, that are offered for sale within the virtual space. In some implementations, content selection element 211 comprises a single representation and/or identification for a set of virtual goods. In some implementations, content selection element 211 is a field configured to receive, e.g., text entry from a user. For example, the text entry may be used to filter and/or search through a set of content identifiers for selection. Content identifiers 230-232 may represent individual virtual goods, e.g. individual items of unlockable in-game content. For example, as depicted in FIG. 2, content identifiers 230-232 may identify a first item ("c1"), a second item ("c2"), and a third item ("c3"), respectively. The first user may select (and/or deselect) individual virtual goods and/or items of content by, e.g., selecting individual ones of content identifiers 230-232. Selection by the first user may be indicated visually within user interface 200 in numerous different ways, including presenting a checkmark along an individual content identifier, changing a background and/or or border around an individual content identifier, and/or by another visually distinct way that distinguishes selected content identifiers from deselected content identifiers.

Information element 250 in FIG. 2 may be used in user interface 200 to present the amount to be paid to purchase the current selection of virtual goods and/or items of unlockable in-game content for the current selection of users. The current selection of virtual goods and/or items of unlockable in-game content may correspond to one or both of content selection element 211 and/or content identifiers 230-232. The current selection of users that are intended to be beneficiaries of the purchase may correspond to one or both of user selection element 210 and/or user identifiers 220-222. In some implementations, the presented amount in information element 250 may automatically be changed and/or updated to reflect changes in either selection within user interface 200.

Action element 251 in FIG. 2 may be a selectable field in user interface 200 which triggers, upon selection, a confirmation from a user that a particular purchase transaction may be authorized, for example by the first user. Specifically, the authorized purchase transaction may correspond to the current selections as described above, and in accordance with the presented information through information element 250. In some implementations, action element 251 may be labeled "Buy Now" when presented to the first user.

Turning back to FIG. 1, in some implementations, server 12 and client computing platforms 14 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server 12 and/or client computing platforms 14 may be connected and/or interface via some other configuration and/or mechanism.

A given client computing platform 14 may include one or more processors, and electronic display, a control interface, and/or other components. The one or more processors may be configured to execute computer program modules. The computer program modules may be configured to enable or user associated with the given client computing platform 14 to interface with system 10, and/or provide other functionality attributed herein to client computing platforms 14. For example, the computer program modules may include a module configured to receive view information from server 12 (e.g., generated by virtual space module 22), and to present a view of the virtual space (e.g., as described above) based on the received view information. This may facilitate participation by the user of the given client computing platform 14 in the game taking place in the virtual space. Client computing platforms 14 may include touchscreens through which the users view the virtual space and/or interact therewith. By way of non-limiting example, the given client computing platform 14 may include one or more of a desktop computer, a laptop computer, a handheld computer, a tablet computing platform, a NetBook, a Smartphone, a gaming console, and/or other computing platforms and/or devices.

Server 12 may include electronic storage 60, one or more processors 20, and/or other components. Server 12 may include communication lines, or ports to enable the exchange of information with a network and/or other computing platforms. Illustration of server 12 in FIG. 1 is not intended to be limiting. Server 12 may include a plurality of hardware, software, and/or firmware components operating together to provide the functionality attributed herein to server 12. For example, server 12 may be implemented "in the cloud" by a plurality of computing platforms operating together as server 12.

Electronic storage 60 may comprise electronic storage media that electronically stores information. The electronic storage media of electronic storage 60 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 60 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 60 may include one or more virtual storage resources (e.g., cloud storage, a virtual private network, and/or other virtual storage resources). Electronic storage 60 may store software algorithms, information determined by processor 20, information received from server 12, information received from client computing platforms 14, and/or other information that enables server 12 to function as described herein.

Processor(s) 20 is configured to provide information processing capabilities in server 12. As such, processor 20 may include one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some implementations, processor 20 may include a plurality of processing units. These processing units may be physically located within the same device, or processor 20 may represent processing functionality of a plurality of devices operating in coordination. The processor 20 may be configured to execute modules 22-27. Processor 20 may be configured to execute modules 22-27 by software; hardware; firmware; some combination of software, hardware, and/or firmware; and/or other mechanisms for configuring processing capabilities on processor 20.

It should be appreciated that although modules 22-27 are illustrated in FIG. 1 as being co-located within a single processing unit, in implementations in which processor 20 includes multiple processing units, one or more of modules 22-27 may be located remotely from the other modules. As a non-limiting example, some or all of the functionality attributed to modules 22-27 may be provided "in the cloud" by a plurality of processors connected through a network. The description of the functionality provided by the different modules 22-27 herein is for illustrative purposes, and is not intended to be limiting, as any of modules 22-27 may provide more or less functionality than is described. For example, one or more of modules 22-27 may be eliminated, and some or all of its functionality may be provided by other ones of modules 22-27. As another example, processor 20 may be configured to execute one or more additional modules that may perform some or all of the functionality attributed below to one of modules 22-27.

Figure 3:
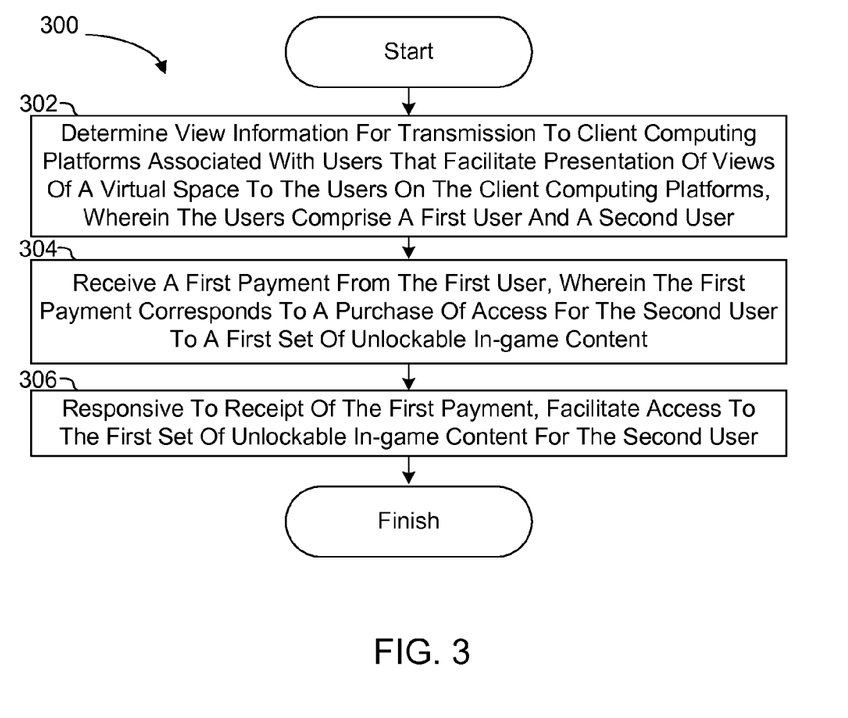
FIG. 3 illustrates a method of enabling a purchase of access to unlockable in-game content.

FIG. 3 illustrates a method 300 of enabling a purchase of access to unlockable in-game content for a user in a virtual space. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, view information is determined for transmission to client computing platforms associated with users. The view information facilitates presentation of views of a virtual space to the users of the client computing platforms, wherein the users comprise a first user and a second user. In some implementations, operation 302 may be performed by a virtual space module similar to or the same as virtual space module 22 (shown in FIG. 1 and described herein).

At an operation 304, a first payment is received from the first user. The first payment corresponds to a purchase of access for the second user to a first set of unlockable in-game content. In some implementations, operation 304 may be performed by a purchase module similar to or the same as purchase module 27 (shown in FIG. 1 and described herein).

At an operation 306, responsive to receipt of the first payment, access to the first set of unlockable in-game content is facilitated for the second user. In some implementations, operation 306 may be performed by a distribution module similar to or the same as distribution module 26 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to enable a purchase of access to unlockable in-game content for a user in a virtual space, the system comprising:
   one or more processors configured to execute computer program modules comprising:
     a virtual space module configured to determine view information for transmissions to client computing platforms associated with users that facilitate presentation of views of a virtual space to the users on the client computing platforms, wherein the users comprise a first user and a second user;
     a purchase module configured to receive payments from users for purchases of access to unlockable in-game content, such that the purchase module is configured to receive a first payment from the first user corresponding to a purchase of access for the second user to a first set of unlockable in-game content separate from in-game content accessible by the first user; and
     a distribution module configured to, responsive to receipt of the first payment, facilitate access by the second user to the first set of unlockable in-game content for the second user without unlocking the first set of unlockable in-dame content for the first user.

2. The system of claim 1, further comprising a user selection module configured to:
   present the first user with an offered set of user identifiers that identify users within the virtual space, and
   receive a first selection by the first user of a user identifier from the offered set of user identifiers, wherein the user selection module is configured such that responsive to receipt of the first selection indicating selection of the user identifier that identifies the second user, the second user is assigned as a beneficiary of the purchase.

3. The system of claim 1, further comprising a content selection module configured to:
   present the first user with an offered set of content identifiers that identify unlockable in-game content for purchase, and
   receive a second selection by the first user of one of the offered set of content identifiers, wherein the content selection module is configured such that responsive to the second selection indicating selection of the first set of unlockable in-game content, access to the first set of unlockable in-game content is facilitated for the second user responsive to the purchase being completed.

4. The system of claim 1, wherein the first set of unlockable in-game content includes one or more of a level of game play in the virtual space, access to a geographic area within the virtual space, a mission, a quest, a puzzle, and/or a challenge.

5. The system of claim 1, wherein the first set of unlockable in-game content includes one or more items that are virtually intangible.

6. The system of claim 1, wherein facilitating access to the first set of unlockable in-game content includes distributing a virtual object to the second user in the virtual space, wherein the virtual object is usable by the second user in the virtual space to access one or more of a level of game play in the virtual space, a geographic area within the virtual space, a mission, a quest, a puzzle, and/or a challenge.

7. The system of claim 1, wherein the first set of unlockable in-game content includes episodic content.

8. The system of claim 1, wherein the first set of unlockable in-game content includes one or more of an ability to play as a particular playable character and/or to play with inclusion of a previously unavailable non-player character.

9. The system of claim 1, wherein the purchase module is further configured to receive the first payment form the first user corresponding to a purchase of access for multiple users to the first set of unlockable in-game content, and wherein the distribution module is further configured to facilitate access to the first set of unlockable in-game content for the multiple users.

10. The system of claim 1, wherein the first payment includes a third-party transaction.

11. A computer-implemented method for enabling a purchase of access to unlockable in-game content for a user in a virtual space, the method being implemented in a computer system comprising one or more processors configured to execute computer program module, the method comprising:
   determining view information for transmission to client computing platforms associated with users that facilitate presentation of views of a virtual space to the users on the client computing platform, wherein the users comprise a first user and a second user;
   receiving a first payment from the first user, wherein the first payment corresponds to a purchase of access for the second user to a first set of unlockable in-game content, separate from in-game content accessible by the first user; and
   responsive to receipt of the first payment, facilitating access by the second user to the first set of unlockable in-game content for the second user without unlocking the first set of unlockable in-game content for the first user.

12. The computer-implemented method of claim 11, further comprising:
- presenting the first user with an offered set of user identifiers that identify users within the virtual space;
- receiving a first selection by the first user of a user identifier from the offered set of user identifiers;
- responsive to receipt of the first selection indicating selection of the user identifier that identifies the second user, assigning the second user as a beneficiary of the purchase.

13. The computer-implemented method of claim 11, further comprising:
- presenting the first user with an offered set of content identifiers that identify unlockable in-game content for purchase, and
- receiving a second selection by the first user of one of the offered set of content identifiers;
- responsive to receipt of the second selection indicating selection of the first set of unlockable in-game content, and responsive to the purchase being completed, facilitating access to the first set of unlockable in-game content for the second user.

14. The computer-implemented method of claim 11, wherein the first set of unlockable in-game content includes one or more of a level of game play in the virtual space, access to a geographic area within the virtual space, a mission, a quest, a puzzle, and/or a challenge.

15. The computer-implemented method of claim 11, wherein the first set of unlockable in-game content includes one or more items that are virtually intangible.

16. The computer-implemented method of claim 11, wherein facilitating access to the first set of unlockable in-game content includes distributing a virtual object to the second user in the virtual space, wherein the virtual object is usable by the second user in the virtual space to access one or more of a level of game play in the virtual space, a geographic area within the virtual space, a mission, a quest, a puzzle, and/or a challenge.

17. The computer-implemented method of claim 11, wherein the first set of unlockable in-game content includes episodic content.

18. The computer-implemented method of claim 11, wherein the first set of unlockable in-game content includes one or more of an ability to play as a particular playable character and/or a new non-player character.

19. The computer-implemented method of claim 11, wherein the first payment corresponds to a purchase of access for multiple users to the first set of unlockable in-game content, and wherein facilitating access to the first set of unlockable in-game content is accomplished for the multiple users.

20. The computer-implemented method of claim 11, wherein the first payment includes a third-party transaction.

21. A non-transient computer readable storage medium having stored thereon computer-readable instructions configured to cause one or more processors to execute a method for enabling a purchase of access to unlockable in-game content for a user in a virtual space, the method being implemented in a computer system comprising one or more processors configured to execute computer program module, the method comprising:
- determining view information for transmission to client computing platforms associated with users that facilitate presentation of views of a virtual space to the users on the client computing platforms, wherein individual users are represented in the virtual space by avatars, wherein the users comprise a first user represented by a first avatar, and a second user represented by a second avatar;
- presenting the first user with an offered set of user identifiers that identify users within the virtual space;
- receiving a first selection by the first user of a user identifier from the offered set of user identifiers;
- responsive to receipt of the first selection indicating selection of the user identifier that identifies the second user, assigning the second user as a beneficiary of the purchase;
- presenting the first user with an offered set of content identifiers that identify unlockable in-game content for purchase;
- receiving a second selection by the first user of one of the offered set of content identifiers;
- receiving a first payment from the first user, wherein the first payment corresponds to the purchase of access for the second user to the first set of unlockable in-game content, separate from in-game content accessible by the first user; and
- responsive to receipt of the second selection indicating selection of the first set of unlockable in-game content, and responsive to receipt of the first payment, facilitating access by the second user to the first set of unlockable in-game content for the second user without unlocking the first set of unlockable in-game content for the first user.

22. The non-transient computer readable storage medium of claim 21, wherein the first set of unlockable in-game content includes one or more of a level of game play in the virtual space, a geographic area within the virtual space, a mission, a quest, a puzzle, and/or a challenge.

* * * * *